G. A. P. PROVAY.
TRUCK TIPPLER OR MEANS FOR DISCHARGING THE CONTENTS OF TRUCKS AND LIKE VEHICLES.
APPLICATION FILED OCT. 5, 1912.

1,094,246.

Patented Apr. 21, 1914.
6 SHEETS—SHEET 1.

G. A. P. PROVAY.
TRUCK TIPPLER OR MEANS FOR DISCHARGING THE CONTENTS OF TRUCKS AND LIKE VEHICLES.
APPLICATION FILED OCT. 5, 1912.

1,094,246.

Patented Apr. 21, 1914.
6 SHEETS—SHEET 3.

G. A. P. PROVAY.
TRUCK TIPPLER OR MEANS FOR DISCHARGING THE CONTENTS OF TRUCKS AND LIKE VEHICLES.
APPLICATION FILED OCT. 5, 1912.

1,094,246.

Patented Apr. 21, 1914.

Witnesses:
Chas. Ovendale
A. Thompson

Inventor:
Giuseppe Antonio Pietro Provay

G. A. P. PROVAY.
TRUCK TIPPLER OR MEANS FOR DISCHARGING THE CONTENTS OF TRUCKS AND LIKE VEHICLES.
APPLICATION FILED OCT. 5, 1912.

1,094,246.

Patented Apr. 21, 1914.
6 SHEETS—SHEET 5.

UNITED STATES PATENT OFFICE.

GIUSEPPE ANTONIO PIETRO PROVAY, OF LOURENÇO MARQUEZ, PORTUGUESE EAST AFRICA.

TRUCK-TIPPLER OR MEANS FOR DISCHARGING THE CONTENTS OF TRUCKS AND LIKE VEHICLES.

1,094,246.    Specification of Letters Patent.    Patented Apr. 21, 1914.

Application filed October 5, 1912. Serial No. 724,175.

*To all whom it may concern:*

Be it known that I, GIUSEPPE ANTONIO PIETRO PROVAY, a subject of the King of Hungary, and resident of Lourenço Marquez, Portuguese East Africa, have invented certain new and useful Improvements in Truck-Tipplers or Means for Discharging the Contents of Trucks and like Vehicles, of which the following is a specification.

This invention appertains to a tippler, dumper or similar contrivance for emptying railway trucks, wagons or other similar wheeled vehicles which traverse a permanent way or track.

It relates in particular to that type of device in which the truck is received bodily in a structure which is adapted to be revolved and thereby partially invert or incline the truck to discharge its contents.

The apparatus can be utilized for handling coal, ore or other fragmentary material, as well as grain or other granular material, or pulverulent material, in bulk. For example, it can be used for transferring coal from railway trucks into a bin or bunker for the coaling of steamers, as well as for loading a ship or steamer with any material in bulk or for any other similar purpose.

The principal object of the present invention is to construct an efficient apparatus, suitable for the purposes above specified, in a simple and comparatively inexpensive manner.

The apparatus is economical to operate as the tipping of the trucks is effected with the expenditure of a minimum of power and the power requisite for lifting the truck is always proportional to the weight of the truck and its contents.

A valuable feature of the invention is that the apparatus can, if desired, be used for lifting the truck in order to discharge its contents into a chute, bin, bunker or the like above the level of the main track traversed by the trucks, thereby obviating the necessity for all inclines in the track and permitting the truck to be taken from the level of the track and the emptying of its contents to be effected at any desired height above the level of such track.

For emptying "composite" trucks or trucks designed to be discharged either at the bottom or at the side, the lifting operation only is necessary. The chute is automatically raised into position beneath the truck and the contents of the latter can be discharged thereinto without tipping or inclining the truck.

The apparatus, with the exception of the control of the motor or its equivalent, is automatic in operation, and consequently it is capable of being operated by a single attendant irrespective of the size or capacity of the trucks or of the quantity of material to be handled.

The tippler or dumping apparatus can be constructed to accommodate wagons or trucks of any type and size, i. e., width, length, height and capacity, the arrangement being easily designed within any desired range of such dimensions; the length of track inside the tippler, the amount of movement transversely of the main track or permanent way allowed to a carriage which supports the length of track inside the tippler, and the extent of the movement of certain beams which engage and clamp the top of the truck, determining said range.

The invention will now be more fully described with the aid of the accompanying drawings, wherein—

Figure 4:
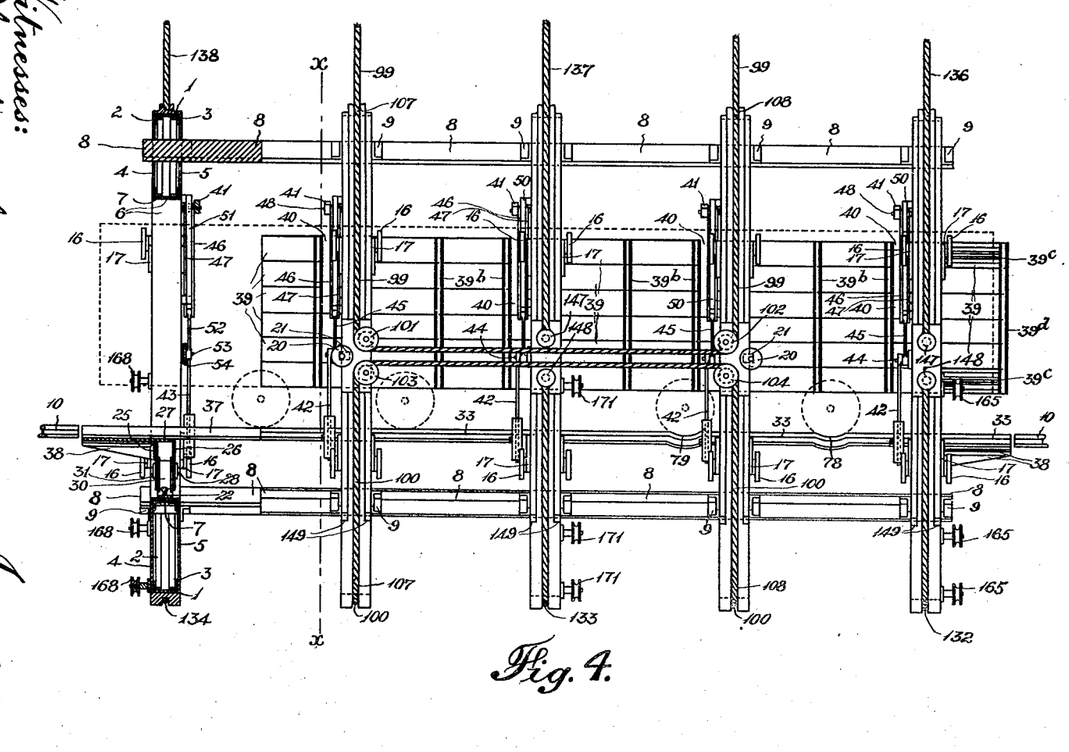
Fig. 4 is a part sectional front elevation of the tippler drawn to an enlarged scale with a truck, shown in dotted lines, in position therein.
Figures 5, 7:
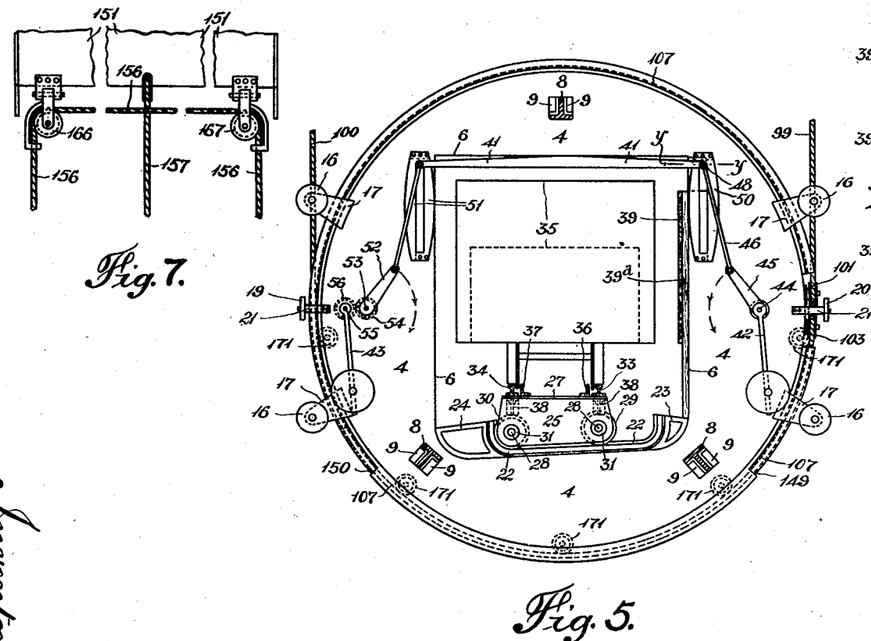
Fig. 5 is a transverse section of Fig. 4 on line $x$—$x$ looking to the right.
Fig. 7 is a plan of portions of the chute and certain parts of its actuating means.

In the construction of the tippler or dumper proper of the apparatus I employ—see more particularly Figs. 4 and 5—a suitable number of cylindrical sections, according to the length of the longest truck which it is desired to tip. Each of these sections may, as shown in Fig. 4, be built up of a ring or hollow cylinder 1, rings 2, 3 of L section riveted or otherwise secured on the inside and at the ends of the ring or cylinder 1, and side or end plates 4, 5, the plates 4, 5 having apertures 6 in them exceeding the height and width of the largest truck. The passage through the several cylindrical sections, provided by the openings 6 in the plates 4, 5, is lined with plates 7, as shown in Fig. 4, so as to inclose the space between the side plates 4, 5 on all sides. The several sections—the tippler in Fig. 4 is shown comprising five of such sections—are securely connected together by means of longitudinal members or ties 8 of T, as shown, or any other suitable section or sections, preferably disposed in relation to each other as shown in Fig. 5, and angle brackets or suitably shaped pieces of plate 9 riveted or otherwise fixed to said members 8 and end plates 4, 5 to make the whole of said five sections a rigid, cylindrical, revoluble structure.

Figure 1:
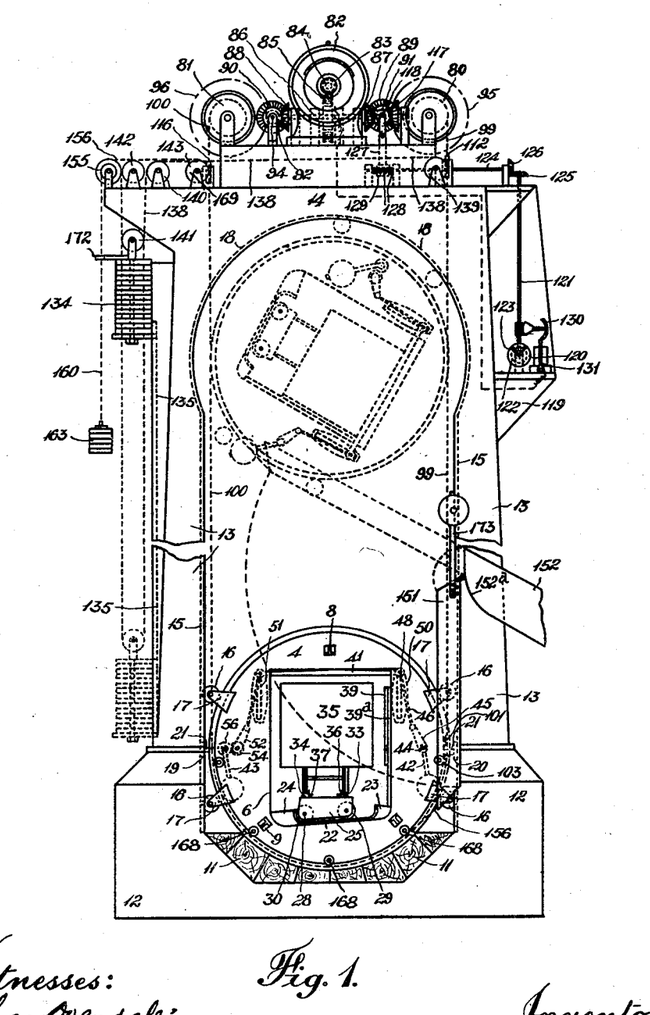
Figure 1 represents the apparatus in end elevation.
Figure 2:
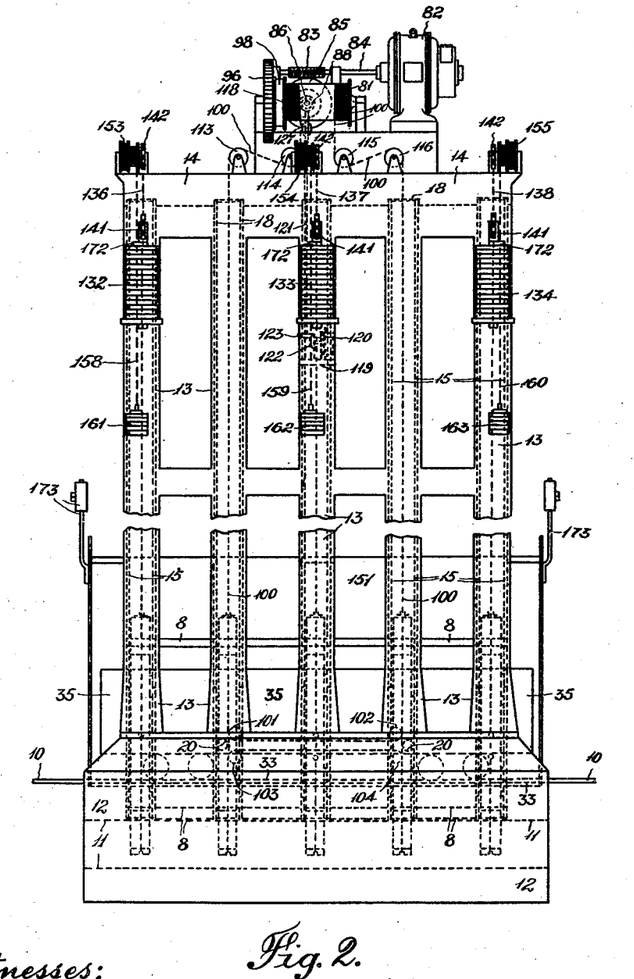
Fig. 2 is an elevation of the apparatus as seen from the back.

The revoluble structure or tippler, when it is placed in a position to receive a truck off the main line or permanent way, (portions 10 of which are represented at each end of the tippler in Figs. 2 and 4) rests upon a bolster or cushion of wooden blocks or other suitable material 11—see Fig. 1, which bolster is arranged upon a base or foundation 12 of concrete or other suitable material.

Upon the base or foundation 12 there is erected a super-structure comprising a suitable number of pairs of pillars or columns 13, arranged in two rows, one pair for each cylindrical section of the tippler. All the pillars or columns 13 of the super-structure are spanned and connected by arches 14—see Figs. 1 and 2—the top of which arches is utilized as a platform for certain portions of the means for manipulating the tippler and its appurtenances.

The superstructure comprising the pillars or columns 13 and the arches 14 may be constructed of ferro-concrete, or of iron, or other suitable metal, timber or any other suitable material or materials.

In the inner and opposing surfaces of the pillars 13 and arches 14 are provided guide-ways 15—which may conveniently consist of channel irons—in which run guide wheels 16 fixed to each of the several cylindrical sections of the tippler. Each section is shown provided with four of such guide-wheels at each side, revolubly secured thereto by means of brackets 17. The guide wheels 16 traverse the guides 15 when the tippler is lifted and rotated—as hereinafter explained—in order to tip a truck. The width between the guide-ways 15 in opposing pillars 13 is such that with the guide-wheels 16 positioned as shown—see Figs. 1 and 5—the tippler cannot be rotated until it has been raised to its maximum height, in which position it can rotate in the curved guide-ways 18 in the upper portion of the superstructure.

19, 20 are rollers fixed at opposite sides of the tippler to two of the sections by means of brackets 21. These rollers 19, 20 revolve in planes at right angles to those of the guide wheels 16, and take up the thrust in a longitudinal direction. The rollers 19, 20 fixed to the one section engage the guide ways on the opposite side to those fixed to the other section.

The guide wheels 16 or rollers 19, 20, or both guide wheels 16 and rollers 19, 20 may, if desired, be supported by brackets constructed integral with, or connected to, pistons or their equivalent, arranged to work in cylinders or guides against suitable strong springs, in order to keep said guide wheels or rollers yieldingly in rolling contact with their guides.

The several sections of the revoluble structure or tippler carry what I may designate a cradle. This cradle consists of a suitable length of rail 22 for each section of the tippler. These rails as shown in Figs. 1 and 5 are downwardly inclined from the front to the back of the tippler and they are curved upwardly at both ends, the curvature thereof corresponding to the radius of the wheels of the carriage or traverser—hereinafter referred to—which travels upon them. The rails 22 are laid on the bottom plates 7, which are arranged at the desired inclination of said rails. 23, 24 indicate suitably shaped supports fixed to the bottom lining plates 7 for supporting the curved ends of the rails 22. The bottom of the openings 6 in the plates 4, 5 of the several cylindrical sections are downwardly inclined from the front to the back to agree with the inclination of the rails 22 and bottom lining plates 7 and said openings are rounded or curved to correspond to the shape of the supports 23, 24.

The carriage or traverser which travels on the several inclined rails 22 comprises for each rail two side plates 25, 26 and a top plate 27. The side plates support the spindles 28 of the two peripherally grooved wheels or flanged rollers 29, 30 of the carriage. The side plates 25, 26 may, as shown at 31, be fashioned with bosses to form the bearings for the spindles 28. The several sections of the carriage or traverser may be connected between the sections of the tippler by means of suitable stays.

Rollers or the like may, if desired, be provided and suitably fixed to the underside of the carriage and arranged to work or run in channel-iron or other suitable guides secured to any or all of the cylindrical sections in order to keep the carriage on its rails 22 should the tippler be rotated while empty or without having a truck within it.

33, 34 represent the length of rails on which the truck 35, the contents of which are to be dumped, run off the rails 10 of the main track or permanent way, and 36, 37 represent check or L rails which are preferably provided on the inside of the rails 33, 34. The rails 33, 34 and check or L rails 36, 37 are suitably fixed upon the top plates 27 of the several sections of the carriage or traverser and serve for rigidly connecting the same. The carriage or traverser, as will be understood on reference to Figs. 1 and 5 of the drawings, can travel in a direction laterally of the rails 10 of the stationary track or permanent way. As shown in Fig. 4 the rails 33, 34 and check or L rails 36, 37 preferably extend a short distance beyond the two outermost sections of the tippler; 38 representing brackets for carrying the overhanging portions of said rails.

The several inclined rails 22 of the cradle are so designed and arranged within their respective sections of the tippler that when the carriage or traverser is at rest at the lower end of said inclined rails—as shown in Figs. 1 and 5—the rails 33, 34 which are mounted upon the carriage or traverser are alined with the rails 10 of the main track at both ends of the tippler. The cradle admits of the necessary travel, transversely of the main track rails 10, of the carriage or traverser together with the rails 33, 34 which are mounted upon it, for one side of the truck 35 to rest upon the inside of the tippler when the latter is rotated, as shown in dotted lines in Fig. 1, to empty the truck 35.

Figures 8, 9, 10:
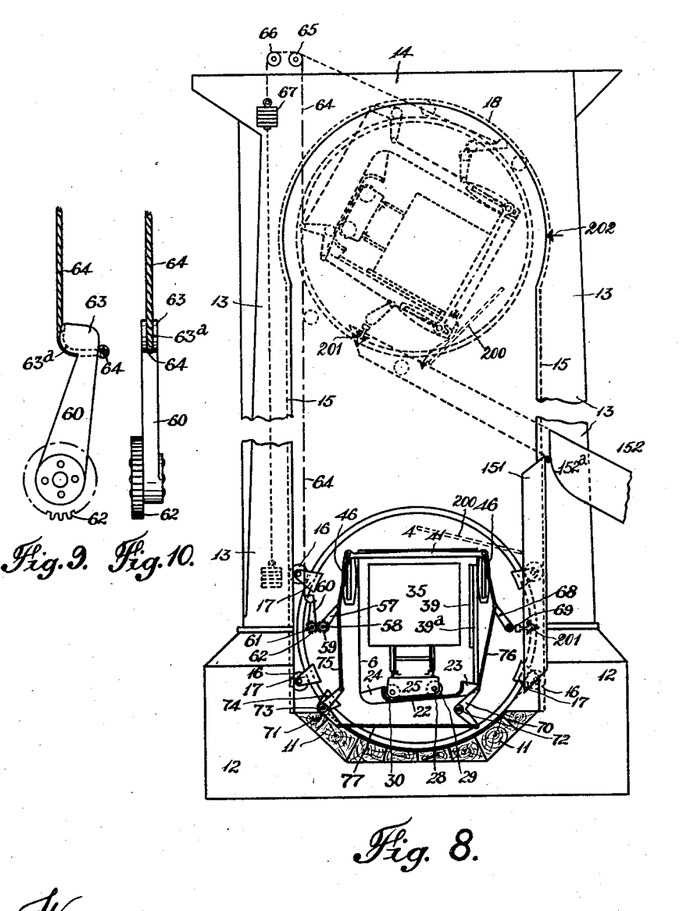
Fig. 8 is an end elevation of certain portions of the apparatus illustrating a modified arrangement for actuating the clamping beams.
Fig. 9 is a view of certain parts of the clamping means for the beams, shown in Fig. 8, drawn to an enlarged scale.
Fig. 10 is an elevation at right angles to Fig. 9.

A mark or pointer 201—see Fig. 8—may be provided and suitably fixed or made on, say, the first section of the tippler, and a mark be provided on the superstructure 13 as indicated at 202 in Fig. 8, the positions of the mark or pointer 201 and mark 202 being such that their coincidence would indicate to the driver or operator that the tippler was then in the exact position for the lowering of the tippler to be commenced.

As shown in dotted lines in Fig. 8, a suitably shaped and inclined plate 200, comprising one or more pieces, may be provided and fixed to the tippler, the said plate being of such a length as to extend between, or through and between, the several cylindrical sections of the tippler and to some extent beyond the two end sections, or so that it exceeds the length of the tippler in both directions, for the purpose of reducing the extent of the free fall of the material from the truck to the movable chute 151, and for diverting the falling material (as indicated by the arrow) in a backward direction into the chute 151, and thereby minimize breakage of the material.

As shown in Figs. 1, 4 and 5 the several sections of the tippler are lined with timber or other suitable material 39 on that side against which the truck 35 rests when the tippler is partially rotated. This timber lining—see more particularly Figs. 1, 5 and 6—is fixed to vertical beams or posts $39^a$ of timber or other suitable material which are secured to the inside lining plate 7. The boards or planks of said lining are also preferably connected together by means of intermediate vertical channel irons $39^b$. Said timber lining 39, as shown in Fig. 4 extends the full distance between the several sections of the tippler and for some distance beyond the end sections so as to afford a large surface for the side of the truck 35 to rest upon when it is inclined, in order to obviate the possibility of deforming or damaging the truck by so inclining it. Those portions of the timber lining which extend beyond the end sections are supported by means of angle brackets $39^c$ suitably fixed to the outside of said outer sections and to said outer portions of the timber lining, and vertical stays or stiffening pieces $39^d$ of U shape, suitably secured to their outer ends. If desired this timber lining 39 can be placed upon springs instead of or in addition to the wooden beams $39^a$ in order the better to buffer the truck 35 and so that the lining 39 will more readily adapt itself to the shape of the side of the truck. The travel of the truck 35 being short and its movement slow there is little acceleration, and consequently a minimum of shock or stress is put upon it when it comes into contact with the lining 39 as a result of the rotation of the tippler.

Figure 6:
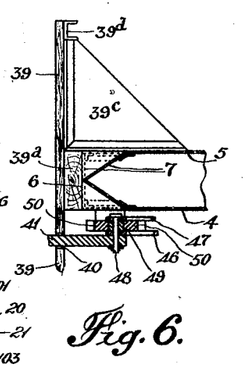
Fig. 6 is an enlarged fragmentary part sectional view of portions of one of the end sections of the tippler, the plane of section being indicated by the dotted line $y$—$y$ Fig. 5.

The inside lining plate 7 on the same side as and above the timber lining 39 is as shown in Fig. 6 of V shape in cross-section or made to diverge toward its point of attachment to the side plates to prevent a surface being formed upon which the material would lodge when the truck is emptied. The timber lining 39 is constructed to provide a vertical slot or groove 40 near each section of the tippler. Said slots 40 are shown formed between the ends of the three upper planks or boards which extend between the adjoining sections of the tippler. The aforesaid slots or grooves allow of the movement therein of certain clamping beams or bars 41, one of which is provided for each section of the tippler. These bars or beams 41 are adjustable vertically as will be hereinafter explained and serve, by engaging the top or upper edges of the sides of any truck (from the deepest to the shallowest) to clamp and secure the same. The bars or beams 41 in the arrangement illustrated in connection with Figs. 1, 4, 5 and 6, are automatically moved up and down, or adjusted vertically when the tippler is rotated, by means of two weighted levers 42, 43, one for each end of the bar. The one weighted lever 42 is fulcrumed upon a spindle 44 fixed to one of the side plates of the section and it has attached to it a lever 45 which it operates. The lever 45 has pivotally connected to its outer extremity a pair of links 46, 47. Links 46, 47 at their other and upper ends are pivotally connected by means of a pin 48 to a cross-head 49—see Fig. 6 and to the end of the bar or beam 41. The cross-head 49 works in vertical guides 50 fixed to the side plate of the section. The other extremity of the bar or beam 41 has similarly pivotally attached to it a cross-head and pair of links, the former working in vertical guides 51 in like manner. The other and lower extremities of the links 46, 47 are pivotally attached to a lever 52 which is fulcrumed on a spindle 53 fixed to the side plate, and has attached to it a pinion 54. The weighted lever 43 is fulcrumed on a spindle 55, and has attached to it a pinion 56 which meshes with the pinion 54. By means of this arrangement both ends of the beam 41 are drawn down into contact with the top of the truck when the truck tippler is rotated in the direction to incline and empty the truck.

As shown in Fig. 5 the weighted levers 42, 43 are slightly inclined toward the right so that when the truck is in an upright position they operate through their respective levers and links to maintain the bar or beam 41 in its uppermost position clear of the top of the truck. The guides 50, 51 through the cross-heads 49 serve as stops to limit the upward movement of the beams. The weights on the levers 42, 43 are so designed that their aggregate weight is sufficient to securely clamp any truck in the tippler.

In Figs. 8 to 10 I illustrate a modified arrangement of the means for automatically operating the clamping beams or bars 41. In this construction a pair of links, crosshead, pin and guides are provided as described in the last construction for each end of the clamping bar or beam 41. The links on the one side are pivotally connected to a lever 57 which is fulcrumed on a spindle 58 and is attached to a pinion 59. 60 is an actuating lever fulcrumed on a spindle 61 and connected with a pinion 62 which meshes with the pinion 59. The pinion 62 may be of the same size as, or if preferred larger than, the pinion 59. The lever 60 is fashioned with a head or protuberance 63 in the form of a sector which is provided with a groove 63ª. 64 is a rope which at one end passes around the groove in the sector or curved surface of the head or protuberance and through a hole in the upper end of the lever 60 to which lever it is attached. The rope 64 is carried up vertically and runs over pulleys or rollers 65, 66 and is attached at its other end to a weight 67. By fashioning the outer end of the lever 60 as shown and attaching the rope thereto in the manner explained the outer end of the lever 60 is thrown slightly inward or toward the center of the tippler which through the pinions 62, 59, lever 57 and links operates to maintain the clamping bars or beams in their uppermost position and clear of the top or upper edges of the sides of the truck when the latter is in an upright position.

68 is a further lever fulcrumed on a spindle 69 and attached at its other end to the links 46, 47 which are connected to the opposite end of the bar or beam 41. The motion of the lever 57 is transmitted to the other lever 68 by means of two bell crank levers 70, 71 fulcrumed on spindles 72, 73 fixed in the one case to the side plate of the section and in the other to a bracket 74 secured to said side plate; 75 being a connecting rod between the lever 57 and one arm of the bell crank lever 71 and 76 a similar connecting rod between one arm of the other bell crank lever 70 and the lever 68. 77 is a rod connecting the other arms of the bell crank levers. The manner in which this arrangement operates will be readily understood on reference to Fig. 8 in which the parts are shown in full lines when the tippler is in its lowermost position and the truck upright, and in dotted lines when the tippler is in its uppermost position and has been partially rotated to incline the truck. During the raising or lowering of the tippler the weight maintains the lever substantially vertical or with a slight inclination toward the truck which as previously explained operates to keep the beam or bar in its uppermost position clear of the top of the truck. When the tippler is in its uppermost position and its rotation has commenced, in order to tip the truck the weight acting through the lever 60 will move the bars or beams into contact with the upper edges of the sides of the truck. When the bars or beams are in this position the weights will continue to be raised so long as the rotation of the tippler continues in the same direction. When the direction of the rotation of the tippler is reversed to place the truck in an upright position the weight will ultimately operate to release the bars or beams from the upper edges of the sides of the truck and place them in their uppermost position as shown in Fig. 8. As the tippler descends the weight will then be raised from the position in which it is shown in dotted lines to that in which it is shown in full lines in Fig. 8. It will be evident that the weights 67 will serve to partially counterbalance the tare weight of the tippler.

For the purpose of bringing the loaded trucks to rest in a symmetrical position in the tippler and to obviate the placing of unequal stresses upon its structure and to save time in shunting the trucks on to the carriage of the tippler, the rails 33, 34 which are carried by said carriage or traverser are, as shown in the drawings, preferably provided at conveniently placed distances apart, corresponding to the wheel bases of the truck to be tipped, with slight concavities or shallow depressions. The rails 33, 34 may, for example, be provided with concavities or depressions 78 for bogie trucks (the truck 35 shown in position in the tippler in Fig. 4 is a bogie truck) and with other concavities or depressions 79 for ordinary trucks. The radius of the concavities 78, 79 will preferably be the average radius of the wheels of the trucks. The concavities being slight, the empty trucks can be easily pushed or hauled over them out of the tippler.

Figure 3:
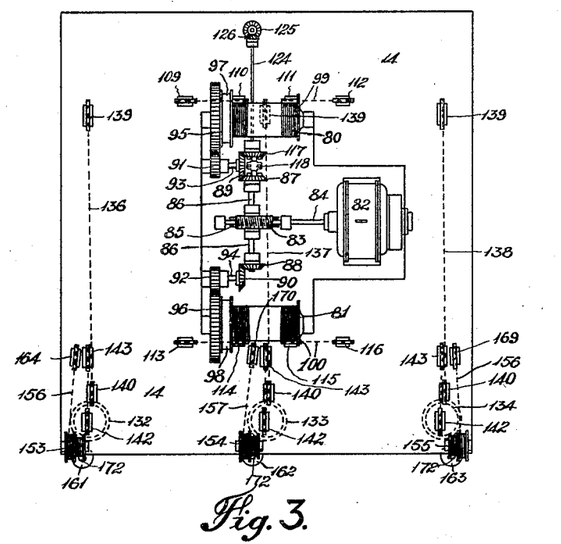
Fig. 3 is a plan of certain parts of the apparatus.

In connection with Figs. 1, 2 and 3 I illustrate the means for manipulating the ropes, chains or their equivalent for lifting the tippler together with the truck to the requisite height to discharge the contents of the latter, located upon the platform provided by the top of the arches 14 of the superstructure. As shown these means comprise two winding drums 80, 81 of the same diameter and driven at the same rate of speed. The driving means are shown consisting of an electric or other suitable motor 82, a worm 83 on the motor shaft 84, a worm wheel 85 fixed upon a shaft 86, bevel wheels 87, 88 on opposite ends of the shaft 86, further bevel wheels 89, 90 which mesh with the bevel wheels 87, 88 respectively, pinions 91, 92 which are driven through the bevel gears by shafts 93, 94 and large spur wheels 95, 96 connected with the drums 80, 81 respectively. 97, 98 represent the brake surfaces of the drums. 99, 100 are two lifting ropes for the tippler, one operated by each of the drums 80, 81. Both ends of each rope are attached to opposite ends of their respective drums, being coiled upon them in the same direction so that both ends of the rope are wound upon the drums when they are moved in one direction and unwound when the drums are moved in the opposite direction. The bights or loops of the two ropes 99, 100 pass around suitably positioned guide pulleys fixed to the front of the tippler and serve as slings for manipulating the tippler or for raising, rotating and lowering the same. 101, 102 represent the pulleys for the one rope 99 (hereinafter styled the front rope) and 103, 104 are the pulleys for the other rope 100 (hereinafter styled the back rope). The rope 100 as shown—see more particularly Figs. 4 and 5—passes underneath the tippler and over the guide pulleys 103, 104. The sections to which the guide pulleys 101, 102, 103, 104 for the ropes 99, 100 are fixed are provided with circumferential bands or rings providing guiding grooves 107, 108 for the ropes. Gaps are provided in the bands or rings in which the pulleys 101, 102, 103, 104 are positioned. 109, 110, 111, 112 are guide pulleys for the front rope conveniently arranged in relation to the drum 80, and 113, 114, 115, 116 are similar guide pulleys for the back rope 100.

It will be understood that by winding the two ropes 99, 100 upon their respective drums at the same speed the tippler can be lifted to the desired height. When the tippler has reached the requisite height the front rope 99 is paid out or uncoiled off its drum 80 and the winding of the back rope 100 upon its drum 81 continued. This has the effect of rotating the tippler and bringing it in the position in which it is shown in dotted lines in Fig. 1, thereby inclining the truck and discharging its contents.

To enable the direction of motion of the front drum 80 to be reversed in order to rotate the tippler as above described a bevel wheel 117 and a clutch 118 are provided. By means of the clutch 118 either bevel wheel 87 or bevel wheel 117 can be employed for transmitting the motion from shaft 86 to bevel wheel 89.

The means for actuating the clutch 118 may be operated either by hand or automatically by the movement of the tippler. I show a hand-actuated means for the purpose, arranged on a platform or cabin 119, said means comprise a hand-wheel 120 which operates a vertical spindle 121 through bevel wheels 122, 123, the motion of spindle 121 being transmitted to a further spindle 124 through bevel wheels 125, 126. The latter spindle 124 operates the clutch lever 127 through the medium of a screw 128 and a nut 129 attached to the clutch lever 127. 130 is an indicator, arranged so as to be visible to the operator, for indicating the position of the clutch.

If desired means may be provided for preventing the truck being inclined beyond an angle which will be sufficient to insure the complete discharge of its contents.

As will be understood the reversal of the motor and the due operation of the clutch mechanism—when the tippler has been rotated to place the truck in an upright position—will result in the lowering of the tippler and the empty truck, the automatic release of the clamping beams 41—which will have come into operation when the tippler was rotated to incline the truck—and the return of the tippler and truck 35 to the position in which the latter can be run out of the tippler along the rails 10 of the main track.

131 is the controller for the electric motor which is arranged on the platform or cabin 119 in close proximity to the hand-wheel 120 of the clutch mechanism.

Means are provided for counterbalancing the weight of the tippler plus a weight slightly less than the tare weight of the smallest truck which it is intended to accommodate or receive in the tippler. The means shown for accomplishing this consist of three weights 132, 133, 134 which weights are guided in grooves 135 in the pillars 13. These weights operate through three ropes 136, 137, 138. For each of the ropes guide pulleys 139, 140, 141, 142, 143 are provided. The ropes are attached to the center and two outer sections of the tippler which sections are also provided with circumferentially grooved bands for the three counterbalancing ropes 136, 137, 138. As shown in Fig. 4 one end of each counterbalancing rope is attached at 147 in the gap in its respective band. The rope as shown in Figs. 1 and 3 then passes over the guide pulley 139 then over the guide pulley 140 under the guide pulley 141 (attached to its weight 132, 133 or 134) then over the guide pulley 142 and over guide pulley 143, then underneath the tippler to which the other end of the rope is attached at 148—see Fig. 4. The several bands or rings in their lower portions or from the point 149 to the point 150—see Fig. 5—are made solid or of rectangular cross section and have the rope groove formed therein. The solid portions of the rings rest upon the bolster 11 and serve to protect the ropes when the tippler is in that position.

The counterbalancing means are shown utilized for operating means which bring into position beneath the inclined truck a hinged chute 151 which receives the contents of the truck when it is tipped and delivers the same into a fixed chute 152 which in turn will deliver it outside the superstructure. The said operating means as shown consists principally of three differential drums 153, 154, 155 one for each of the counterbalancing weights 132, 133, 134; two ropes 156, 157, three other ropes 158, 159, 160, and three weights 161, 162, 163. The ends of one of the ropes (156) are fixed to the larger sections of two of the differential drums 153, 155 and one end of the other rope is also fixed to the larger section of the other differential drum 154. The rope 156 one end of which is attached to the larger section of the differential drum 153 passes over a guide pulley 164 arranged in front of the drum and then in a downward direction and underneath a number of guide pulleys 165 which are rotatably attached to the one end section of the tippler, then to and around a guide pulley 166 which is hinged to the edge of the chute near the one side, see Fig. 7, then around another guide pulley 167 which is hinged to the edge of the chute near the other side, then under a number of guide pulleys 168 which are rotatably attached to the other end section of the tippler and then around a guide pulley 169 which is arranged in front of the other differential drum 155 to which this, the other end, of the rope is attached. As shown in Fig. 7 the hinged guide pulleys 166, 167 are preferably provided with guides for the rope. The other rope 157 is attached at one end to the larger section of the third differential drum 154 which is intermediate the other two differential drums 153, 155. This rope 157 passes off the drum and around a guide pulley 170 arranged in front thereof, then down to and under the several guide pulleys 171 which are rotatably attached to the middle section of the tippler, and then to the chute 151 to which it is attached at a point midway between the points of attachment of the hinged pulleys to the chute. The three other ropes 158, 159, 160 are fixed at one end upon the circumference of the smaller sections of the three differential drums 153, 154, 155. The said ropes then pass through holes in the ends of arms 172 connected to the counterbalancing weights 132, 133, 134. To the lower ends of the ropes 158, 159, 160 there are attached the three weights 161, 162, 163. The length of said three ropes is such that the arms 172 do not depress the weights 161, 162, 163 until the tippler has been lifted clear of the hinges of the chute 151. The depression of the three weights 161, 162, 163 by the arms 172 unwinds the three ropes 158, 159, 160 off the smaller sections of the three differential drums 153, 154, 155. The rotation of said drums winds on to the larger sections thereof the ropes 156, 157 which latter being connected to the chute 151 as hereinbefore described brings the same into its proper position beneath the tippler (in which position it is shown in dotted lines in Figs. 1 and 8) just prior to or simultaneously with the tippler reaching its maximum height.

The rope 157 and the intermediate differential drum 154 and the other parts coöperating therewith might be dispensed with and the one rope 156 and the two differential drums 153, 155 and their coöperating parts be alone used for actuating the chute.

Brake bands, actuated electrically by the controller 131 or otherwise, can be fixed on, or combined with, the differential drums 153, 154, 155, in order to keep the chute 151 positively in the inclined position during the tipping operation.

As shown in Figs. 1 and 2 counterbalancing weights 173 may be fixed to arms attached to the hinged end of the chute 151 to assist in the raising of the chute into its operative position beneath the truck.

The fixed chute 152 as shown in Fig. 1 may be curved at the bottom in its upper portion as indicated at 152ª to prevent any accumulation of the material at that point, and also to insure a gradual fall of the material as it enters the fixed chute 152 from the movable chute 151.

Figure 11:
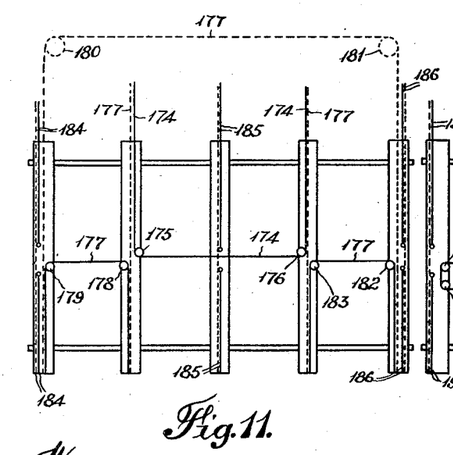
Fig. 11 is a diagrammatic representation of the tippler and the counterbalancing ropes, showing a modified arrangement of the ropes for lifting and revolving the tippler.

In Fig. 11 I illustrate an alternative arrangement of the lifting and revolving ropes for the tippler, in which the front rope 174 passes around guide pulleys 175, 176 fixed to the front of the tippler as in the last described arrangement. The back rope 177 passes off one end of the drum underneath the tippler, then over guide pulleys 178, 179 at the front of the tippler, then under the tippler, then over any suitable arrangement of guide pulleys represented by the circles 180, 181 then underneath the other end of the tippler, then over guide pulleys 182, 183 at the front of the tippler, then under the tippler and back to the other end of the drum. The three ropes 184, 185, 186 for the three counterbalancing weights are arranged and connected to the tippler in the same manner as in the first described construction.

With the arrangement above described (Fig. 11) the drum 81 to which the two ends of the back rope 177 are attached and upon which said rope is wound must be twice the diameter or be driven at twice the speed of the other drum 80 to which the ends of the front rope 174 are attached and upon which said rope is wound. This arises owing to the fact that the drum 81 during any given period has to take up or pay out twice the length of rope that the other drum 80 has.

Figure 12:
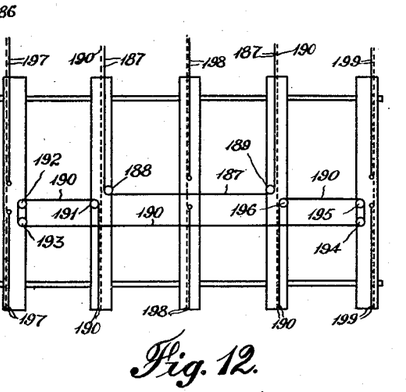
Fig. 12 is a view similar to Fig. 11 illustrating a further modified arrangement of the lifting and revolving ropes for the tippler.

In Fig. 12 I show a further alternative arrangement of the lifting and revolving ropes for the tippler. In this case also the front rope 187 passes around guide pulleys 188, 189 fixed to the front of the tippler as in the two previously described arrangements. The back rope 190 passes off one end of the drum underneath the tippler then over a guide pulley 191 fixed to one section; then around two guide pulleys 192, 193 fixed to the adjoining end section, then around two guide pulleys 194, 195 fixed to the other and opposite end section, then around another pulley 196 fixed to the section adjoining said latter section, then under the tippler and back to the other end of the drum. The three counterbalancing ropes 197, 198, 199 are arranged in the same manner as in the two previously described constructions.

It is evident that the means for clamping the truck in the tippler may in the one tipping apparatus comprise a combination of the two means illustrated in Figs. 1 and 8, that is to say, that certain of the clamping bars or beams 41 can be actuated by weighted levers 42, 43—see Fig. 1—and other similar clamping bars by the weights 67—see Fig. 8—in which event the weighted levers 42, 43 and weights 67 would coöperate to clamp the truck 35 in position in the tippler.

Suitable tripping devices or limiting switches, such as are commonly provided in many hoists, may be utilized for preventing overwinding.

What I claim as my invention and desire to protect by Letters Patent is:—

1. A truck tipping apparatus comprising in combination a revoluble structure, a wheeled carriage movable within and transversely of said structure, a track supported by the aforesaid structure and traversed by the wheels of the carriage, said track being inclined from the front to the back of the structure to cause the carriage to automatically take up a position in which the length of rails carried by it are in alinement with the rails of the main track.

2. A truck tipping apparatus comprising in combination a revoluble structure, a wheeled carriage movable within and transversely of said structure, rails supported by the aforesaid structure and traversed by the wheels of the carriage, said rails being inclined from the front to the back of the structure and curved upwardly at the ends.

3. A truck tipping apparatus comprising in combination a revoluble structure consisting of a plurality of cylindrical sections rigidly connected together, a wheeled carriage movable within and transversely of said structure, a rail supported by each section of the structure which rails are inclined from the front to the back of the structure and are traversed by the wheels of the carriage, a length of rails mounted upon the carriage which carriage automatically assumes such a position that the said length of rails are alined with the rails of the main track when the truck is upright.

4. A truck tipping apparatus comprising in combination a revoluble structure, means for guiding said structure as it is raised and lowered, means for raising, lowering and revolving said structure, a carriage movable within and transversely of said structure, a transverse track supported by said revoluble structure and traversed by the wheels of the carriage, said track being inclined from the front to the back of the structure, and means for automatically clamping the truck in position in said structure when the structure is rotated to incline the truck.

5. A truck tipping apparatus comprising in combination a revoluble structure, means for guiding said structure as it is raised and lowered, said means permitting the structure to be revolved when it has reached its uppermost position, counterbalancing means for said structure, a carriage movable within and transversely of said structure, a transverse track supported by said revoluble structure and traversed by the wheels of the carriage, said track being inclined from the front to the back of the structure, means for automatically clamping the truck in position in said structure when the structure is rotated to incline the truck, a chute, and means for automatically bringing said chute into position beneath the structure before it is rotated to tip the truck.

6. A truck tipping apparatus comprising in combination a revoluble structure, means for raising, lowering and revolving said structure, means for guiding said structure as it is raised and lowered, said guiding means permitting the structure to be revolved when it has reached its uppermost position, means for counterbalancing said structure, a carriage movable within and transversely of said structure, a transverse track supported by said revoluble structure and traversed by the wheels of the carriage, said track being inclined from the front to the back of the structure, means for automatically clamping the truck in position in the structure during the operation of rotating the latter to incline the truck, a chute, and means for automatically bringing said chute into position beneath the structure before it is rotated to tip the truck.

7. A truck tipping apparatus comprising in combination a revoluble structure, a wheeled carriage movable within and transversely of said structure, a track supported by the aforesaid structure and traversed by the wheels of the carriage, said track being inclined from the front to the back of the structure to cause the carriage to automatically take up a position in which the length of rails carried by it are in alinement with the rails of the main track when the structure is in its lowermost position, means for guiding said structure as it is raised and lowered, said means permitting the structure to be revolved when it has reached its uppermost position, means for counterbalancing the weight of the structure, means for automatically clamping the truck in position in the structure during the operation of rotating the latter to incline the truck, a chute, means for automatically bringing said chute into position beneath the structure before it is rotated to tip the truck, and means whereby the truck is brought to rest in a symmetrical position in the structure.

8. A truck tipping apparatus comprising a revoluble structure, means for raising, lowering and revolving said structure, means for guiding said structure as it is raised and lowered, said guiding means permitting the structure to be revolved after it has been raised, a carriage movable within and transversely of said structure, a transverse track supported by said revoluble structure and traversed by the wheels of the carriage, said track being inclined from the front to the back of the structure, means for automatically clamping the truck in position on said carriage and within said structure, said means comprising a clamping bar, cross-heads for each end of said clamping bar, guides for said cross-heads, a pair of levers, links connecting the ends of said levers to the ends of said clamping bar, counter-weighted levers which operate the clamping bar through the aforementioned levers and links and gear for insuring movement of both ends of the clamping bar in the same direction.

9. A truck tipping apparatus comprising a revoluble structure, means for raising, lowering and revolving said structure, means for guiding said structure as it is raised and lowered, said guiding means permitting the structure to be revolved after it has been raised, a carriage movable within and transversely of said structure, means for automatically clamping the truck in position on said carriage and within said structure, said means comprising a clamping bar, guides for the ends of said clamping bar, a pair of levers, links connecting the ends of said levers with the ends of said clamping bar, a pair of bell crank levers and links connecting the first mentioned levers with one arm of each of the bell crank levers, a connecting rod connecting together the other arms of the bell crank levers, a lever, a weight and a flexible connection between the last mentioned lever and said weight and a gear for insuring movement of both ends of the clamping bar in the same direction, the connection between the lever and flexible connection being such that the lever through the gearing operates to keep the clamping bar in its uppermost position until the structure is revolved.

10. A truck tipping apparatus comprising a revoluble structure, means for guiding said structure as it is raised and lowered, said guiding means permitting the structure to be revolved after it has been raised, a carriage movable within and transversely of said structure for carrying the truck to be tipped, a transverse track supported by said revoluble structure and traversed by the wheels of the carriage, said track being inclined from the front to the back of the structure, means for automatically clamping the truck in position on said carriage, and means for raising, lowering and revolving said structure comprising front and back ropes in which the revoluble structure is slung, guiding pulleys for said ropes and winding drums.

11. A truck tipping apparatus comprising a revoluble structure, means for raising, lowering and revolving said structure, means for guiding said structure as it is raised and lowered, said means preventing rotation of the structure until it has reached a given height, a carriage movable within and transversely of said structure, a transverse track supported by said revoluble structure and traversed by the wheels of the carriage, said track being inclined from the front to the back of the structure, and means for automatically clamping the truck in position on said carriage before the structure is revolved to tip the truck.

12. A truck tipping apparatus comprising a revoluble structure consisting of a plurality of sections, means for raising, lowering and revolving said structure, means for guiding said structure as it is raised and lowered, said guiding means permitting the structure to be revolved after it has been raised, a carriage movable within and transversely of said structure for carrying the truck to be tipped, means for automatically clamping the truck in position on said carriage, the several sections of the revoluble structure having grooved bands for the reception of the raising, lowering and revolving ropes and being made solid at the sides of the groove for a portion of the circumference of the structure for supporting the structure when it is in its lowermost position.

13. A truck tipping apparatus comprising in combination a revoluble structure, means for guiding said structure as it is raised and lowered, means for raising, lowering and revolving said structure, a carriage movable within and transversely of said structure, a transverse track supported by said revoluble structure and traversed by the wheels of the carriage, said track being inclined from the front to the back of the structure, means for automatically clamping the truck in position in said structure when the structure is rotated to incline the truck, a chute, and means for bringing said chute into position beneath the structure before it is revolved to incline the truck, said latter means comprising weights, ropes, guide pulleys and differential drums.

14. A truck tipping apparatus comprising in combination a revoluble structure, means for guiding said structure as it is raised and lowered, means for raising, lowering and revolving said structure, a carriage movable within and transversely of said structure, a length of rails mounted on said carriage, said rails being provided with slight concavities or depressions to bring the trucks to rest in symmetrical positions in the revoluble structure.

15. A truck tipping apparatus comprising in combination a revoluble structure, means for guiding said structure as it is raised, lowered and revolved, means for raising, lowering and revolving said structure, a carriage movable within and transversely of said structure, a transverse track supported by said revoluble structure and traversed by the wheels of the carriage, said track being inclined from the front to the back of the structure, means whereby a truck can be automatically clamped in position upon the carriage when the structure is rotated to tip the truck, and an inclined plate upon which the material is received as it falls from the truck.

16. A truck tipping apparatus comprising in combination a revoluble structure, means for guiding said structure as it is raised, lowered and revolved, means for raising, lowering and revolving said structure, a carriage movable within and transversely of said structure, a transverse track supported by said revoluble structure and traversed by the wheels of the carriage, said track being inclined from the front to the back of the structure, means whereby a truck can be automatically clamped in position upon the carriage when the structure is rotated to tip the truck, a chute, means for automatically bringing said chute into position beneath the structure before it is rotated to tip the truck, and an inclined plate upon which the material is received as it falls from the truck into the chute.

In testimony whereof I have signed my name to this specification in the presence of two subscribing witnesses.

GIUSEPPE ANTONIO PIETRO PROVAY.

Witnesses:
PERCY ROBINSON,
ARTHUR THOMAS LAURENCE.